United States Patent [19]

Chen

[11] Patent Number: 5,082,190
[45] Date of Patent: Jan. 21, 1992

[54] PEPPER GRINDER

[76] Inventor: Tzung-Wen Chen, 2F3R, No. 14, Ching Chung St., Tainan, Taiwan

[21] Appl. No.: 622,512

[22] Filed: Dec. 5, 1990

[51] Int. Cl.⁵ .............................................. A47J 42/04
[52] U.S. Cl. ................................ 241/169.1; 241/258; 241/259; 241/259.1
[58] Field of Search ..................... 241/168, 169.1, 169, 241/257 R, 258, 259.1, 285 R, 285 A, 259

[56] References Cited

U.S. PATENT DOCUMENTS

| | | | |
|---|---|---|---|
| 4,374,574 | 2/1983 | David | 241/169.1 |
| 4,632,322 | 12/1986 | Beilstein | 241/169.1 |
| 4,697,749 | 10/1987 | Holcomb et al. | 241/169 |

Primary Examiner—Mark Rosenbaum

[57] ABSTRACT

A pepper grinder possible to be manually operated by pressing or releasing a manipulating plate movably mounted in an opening of the outer wall of a cylindrical body in such a way that a grinding wheel is possible to be rotated by a unit of mechanical structure moved by pressing inward the manipulating plate or to be stopped by releasing back the manipulating plate and thus the pepper grains falling into a gap between a grinding wheel and a grinding cylinder can be ground. Besides, the gap between the two components can be adjusted to change the degree of minuteness of the pepper ground.

5 Claims, 8 Drawing Sheets

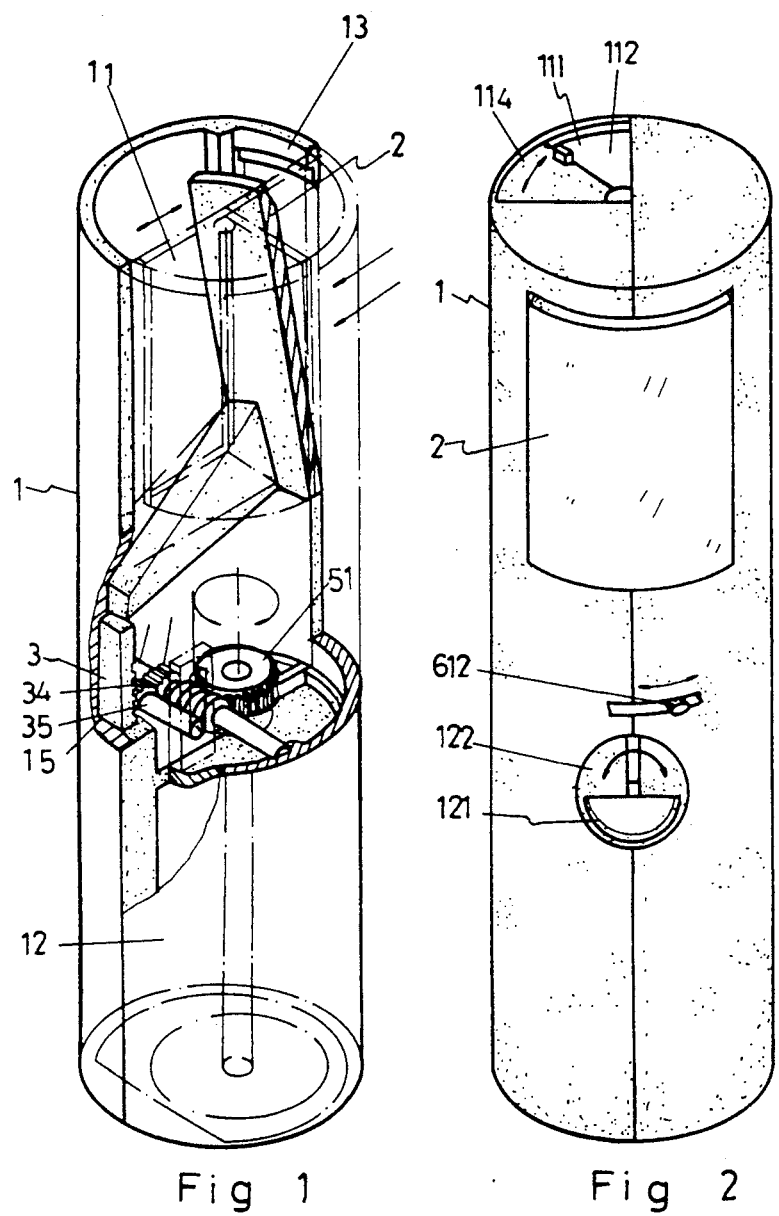

PEPPER GRINDER

BACKGROUND OF THE INVENTION

This invention concerns a pepper grinder possible to be operated with a single hand, and the degree of minuteness of the pepper ground can be adjusted.

SUMMARY OF THE INVENTION

The pepper grinder in the present invention comprises a cylindrical body to contain a salt chamber, a pepper (grain) chamber and the mechanical components for grinding.

The salt chamber is arranged in the upper section of the body, having a filling opening and pouring-out holes on the upper wall selectably covered by a rotatable lid.

The pepper (grain) chamber is provided in the lower section of the body, having a filling opening in the vertical wall of the body covered with rotatable lid.

The mechanical components for grinding includes a manipulating plate, a rack to be moved by the manipulating plate, a movable gear to engage with the rack, a gear mounted on a same shaft that a worm is mounted on and able to engage or disengage with the movable gear, a worm and a worm wheel mounted on the top end of a long shaft to engage with the worm, a long shaft extending vertically through the pepper chamber and mounted with the worm wheel at its top end and a grinding wheel at its bottom end and a grinding cylinder fixed around the bottom inner surface of the pepper chamber to surround the grinding wheel.

The manipulating plate is movable mounted in a rectangular opening in the vertical wall in the upper section of the body and can be manually pressed to incline only inward by means of two tennons and two mortises so that a sidewise triangle arm projecting inward from the inner surface of the plate can press down the rack with its tip. When the rack is pressed down, it can rotate the movable gear to move down toward the gear on the same shaft of the worm and finally engage with the gear to rotate it. Then the worm can rotate together with the gear to rotate the worm wheel and the shaft. So the grinding wheel can be rotated by the shaft to rub against the pepper grains falling from the pepper chamber in the gap between the grinding wheel and the grinding cylinder. Therefore, the pepper grains can be ground into powder and fall down through bottom holes.

There are two height adjusters for raising or lowering the shaft mounted with the grinding wheel, combined just under the worm wheel through the shaft. These two height adjusters can be changed in its height by turning the upper one for 0-360 degrees to raise the worm wheel and also the shaft and in the result the grinding wheel is also raised accordingly to gradually lessen the gap between itself and the grinding cylinder. Thus the pepper grains can be ground more minute in different degrees.

BRIEF DESCRIPTION OF THE DRAWINGS

FIG. 1 is an inside perspective view of the first embodiment of the pepper grinder in the present invention.

FIG. 2 is a perspective view of the first embodiment of the pepper grinder in the present invention.

DETAILED DESCRIPTION OF THE INVENTION

Figure 3:
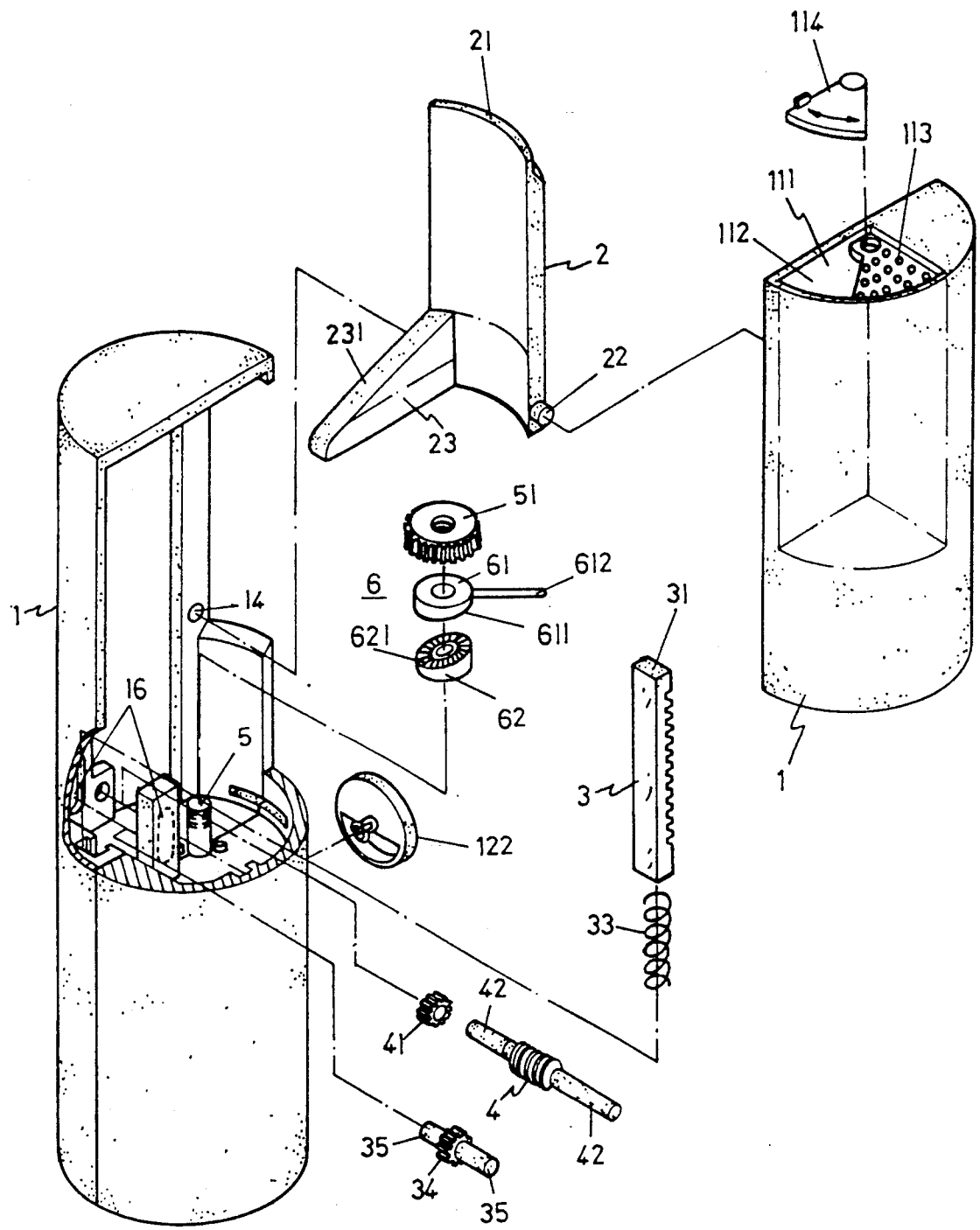
FIG. 3 is an exploded perspective view of the first embodiment of the pepper grinder in the present invention.

The first embodiment of the pepper grinder in the present invention, as shown in FIGS. 1, 2, 3, comprises a body 1 of a cylindrical shape, a salt chamber 11 in the upper section of the body 1, a pepper (grain) chamber 12 in the lower section of the body 1. At the top of the salt chamber 11 is provided a filling means 111 having a large opening 112 and a plurality of small holes 113 and a rotatable lid 114 covered on the filling means 111. The rotatable lid 114 can be rotated to selectably cover the large opening 112 or the small holes 113 to fill in salt or to pour it out through the small holes 113. A pepper filling opening 121 is provided in the vertical wall of the middle section of the body 1 and covered with a round rotatable lid 122.

A rectangular vertical opening 13 is provided in the upper section of the body 1 for a manipulating plate 2 to be mounted therein and surrounding circumferential edge of the opening 13 can prevent the circumferential edge 21 of the manuipulating plate 2 to move out of or fall off the body 1.

Figures 4, 5:
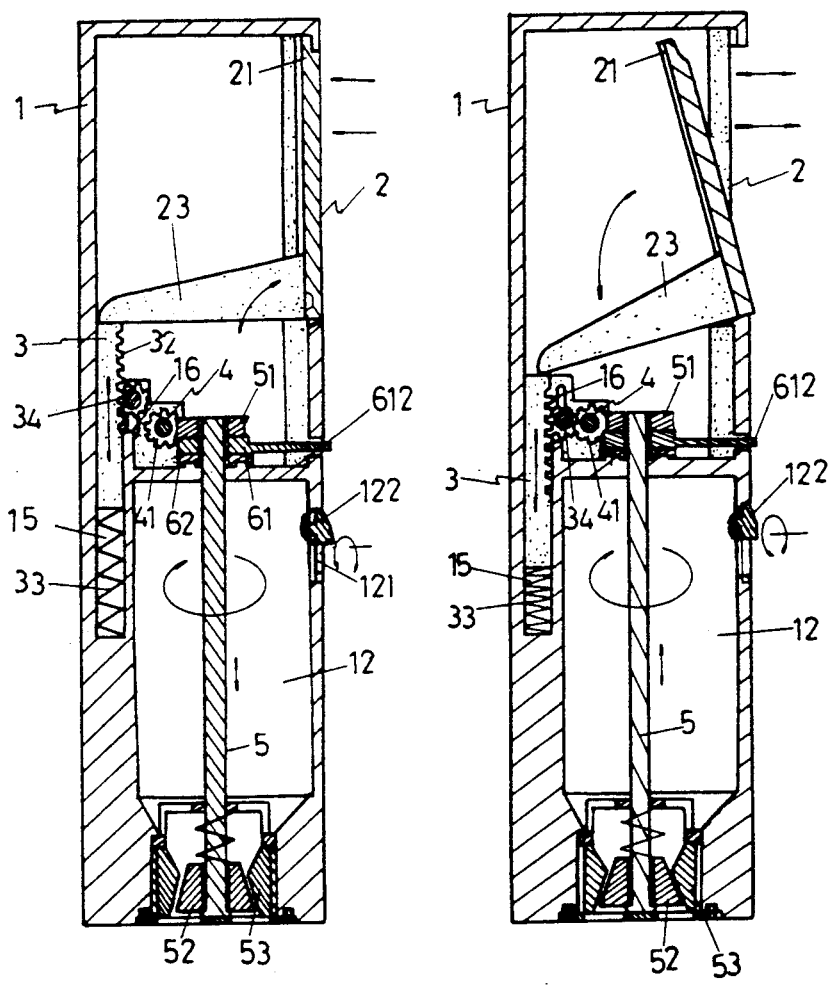
FIG. 4 is a cross-sectional view of the first embodiment of the pepper grinder in the static condition in the present invention.
FIG. 5 is a cross-sectional view of the first embodiment of the pepper grinder in the working condition in the present invention.
Figure 6:
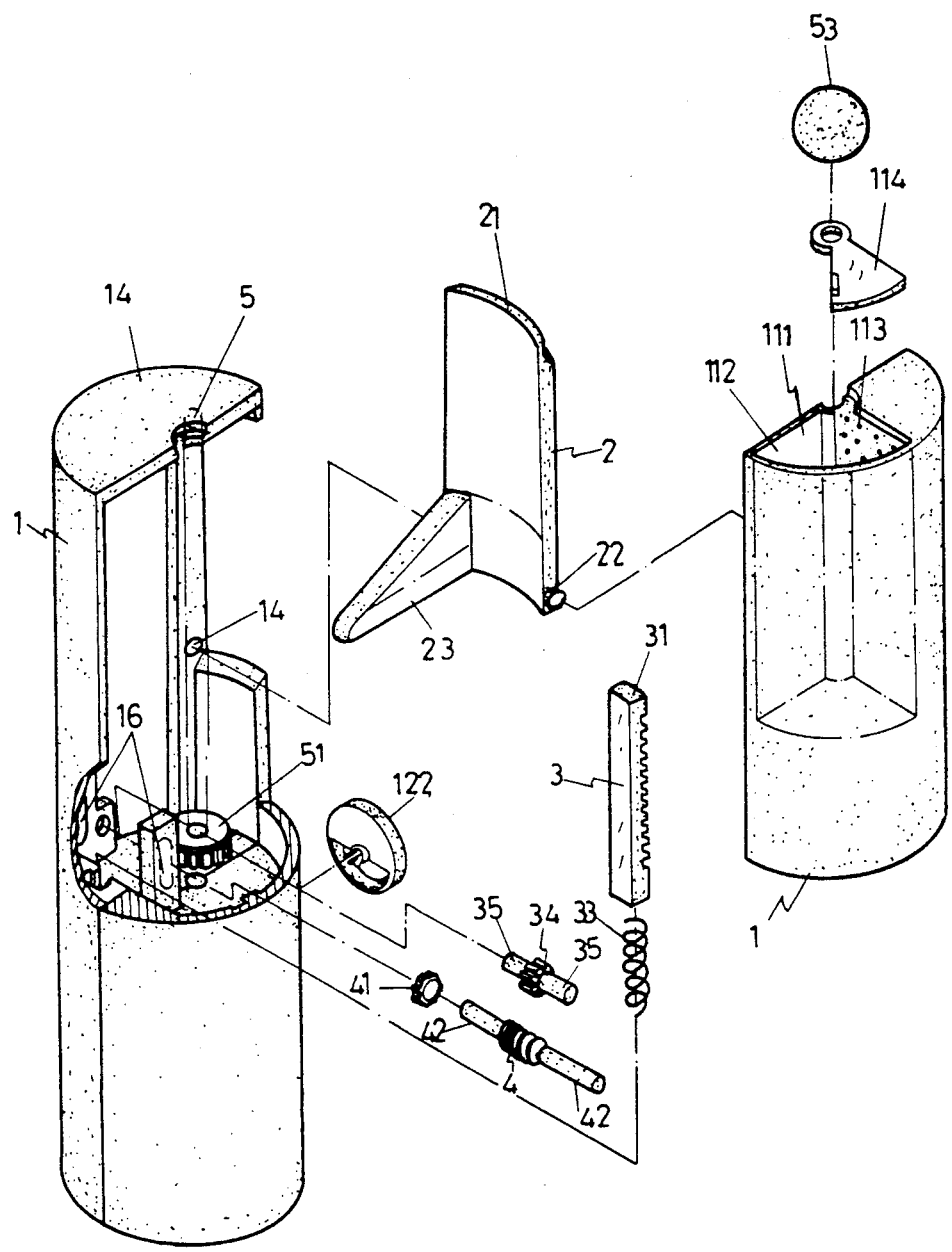
FIG. 6 is an exploded perspective view of the first embodiment of the pepper grinder in the present invention.

The curved rectangular manipulating plate 2 is arranged to close the opening 13 and provided with two projecting round tennons 22 separately at the lowest point of the two vertical sides to fit in two round mortises 14 in the vertical edge of the wall of the body 1. Thus, the manipulating plate 2 can be pressed to tilt only inward with the tennons 22 as pivots. In addition, the manipulating plate 2 has a triangular arm 23 protruding radially inward from the left lower section. The arm 23 has an inclined upper side 231 and the front of the bottom side being in contact with the top flat face 31 of a rack 3 as shown in FIGS. 1, 4, 5.

A rack 3 is to be fixed in a rack recess 15 in the vertical wall of the body 1, having a teeth surface 32. In the rack recess 15 under the rack is placed a compress spring 33 to resiliently push back the rack to its original position when it is not pressed down by the arm 23. The teeth surface 32 engages with a gear 34, and a shaft 35 of the gear 34 has both ends fitting in a pair of vertical corresponding long recesses 16 in the body 1. Thus, when the rack 3 is pressed down from the original position by the arm 23 of the manipulating plate 2 pushed inward, the ends of the shaft 35 are to be moved from the upper ends of the recesses 16 to the lower ends of the recesses 16 through the movement of the gear 34 by the rack 3 as shown in FIG. 5. On the contrary, when the rack 3 is released by releasing of the manipulating plate 2, the ends of the shaft 35 are to be raised from the lower ends of the recesses 16 to the upper ends as shown in FIG. 4.

A grinding wheel 52 is provided fixedly at the bottom end of the shaft 5 and a grinding cylinder 53 is provided around the bottom inside wall of the body 1, surrounding the grinding wheel 52. When the grinding wheel 52 is rotated by the shaft 5, pepper grains falling in the gap between the grinding wheel 52 and the grind cylinder 53 can be ground into powder. But if the manipulating plate 2 is released, the arm 23 no longer presses down the rack 3, which is then pushed up by the spring 33 to the original position, then the gear 34 is also moved up by the rack 3, disengaging with the gear 41, and then the gear 41 stops to rotate, causing the worm 4 to stop and also the shaft 5. Therefore, the grinding wheel 52 also stops rotating and the grinding action ceases.

A pair of height adjusters 6 for the grinding wheel 52 are provided just under the worm wheel 51, also fixed on the shaft 5 and consisting of an upper round adjuster 61 and a lower round adjuster 62. The upper adjuster 61 has an inclined bottom surface 611 to touch with an inclined upper surface 621 of the lower adjuster 62. In addition, the upper adjuster 61 also has an adjusting bar 612 projecting sidewise so that the upper adjuster 61 can be rotated for 0-360 by the bar 612 to change the mutual touching point of both the inclined surfaces 611 and 621 and accordingly the height of the height adjusters 6 because of the lower adjuster immovably fixed with the shaft 52, and the worm wheel can accordingly be raised up to pull up the shaft 5. In the result, the gap between the grinding wheel 52 and the grinding cylinder 53 can be gradually changed from the largest to the smallest so that pepper grains can be ground into powder having different minuteness.

The height adjusters 6 can be substituted by a screw-threaded button 54 to screw with the top end of the shaft 5 extending upward through the top surface 14 of the body 1 so that the buttom screwing inward or outward with the top end of the shaft 5 can raise or lower the grinding wheel 52 so as to change the degree of minuteness of the pepper ground.

Next, the second embodiment of the pepper grinder in the present invention, as shown in FIGS. 7-13, comprises also a cylindrical body 1, a salt chamber 11 at the upper section of the body 1, and a pepper chamber 13 at the lower section of the body 1. On the opposite side of the salt chamber 11 is provided a vertical rectangular openings 12 in the vertical wall of the body 1, and a vertical rectangular curved manipulating plate 2 is provided to be placed in the opening 12. The opening 12 is surrounded by an upper projecting-down wall 121, a lower projecting-up wall 121, and the manipulating plate 2 closes the opening 12 in its original position, having the circumferential edge resting upon those walls 121, 122, 123 without falling off. The manipulating plate 2 is provided with two round posts 23 projecting sidewise in parallel from the inner surface, and the posts 23 are to fit and move in two tubal projections 124 on the vertical wall 112 of the salt chamber 11. The tubal projections 124 each have a spring 24 put in the central cavity and to resiliently push the posts 23 so that the manipulating plate 2 can be pushed back to its original position—closing the openings 12-guided by the posts 23 moving along the tubal projections 124 after pressed inward manually.

Figures 7, 8:
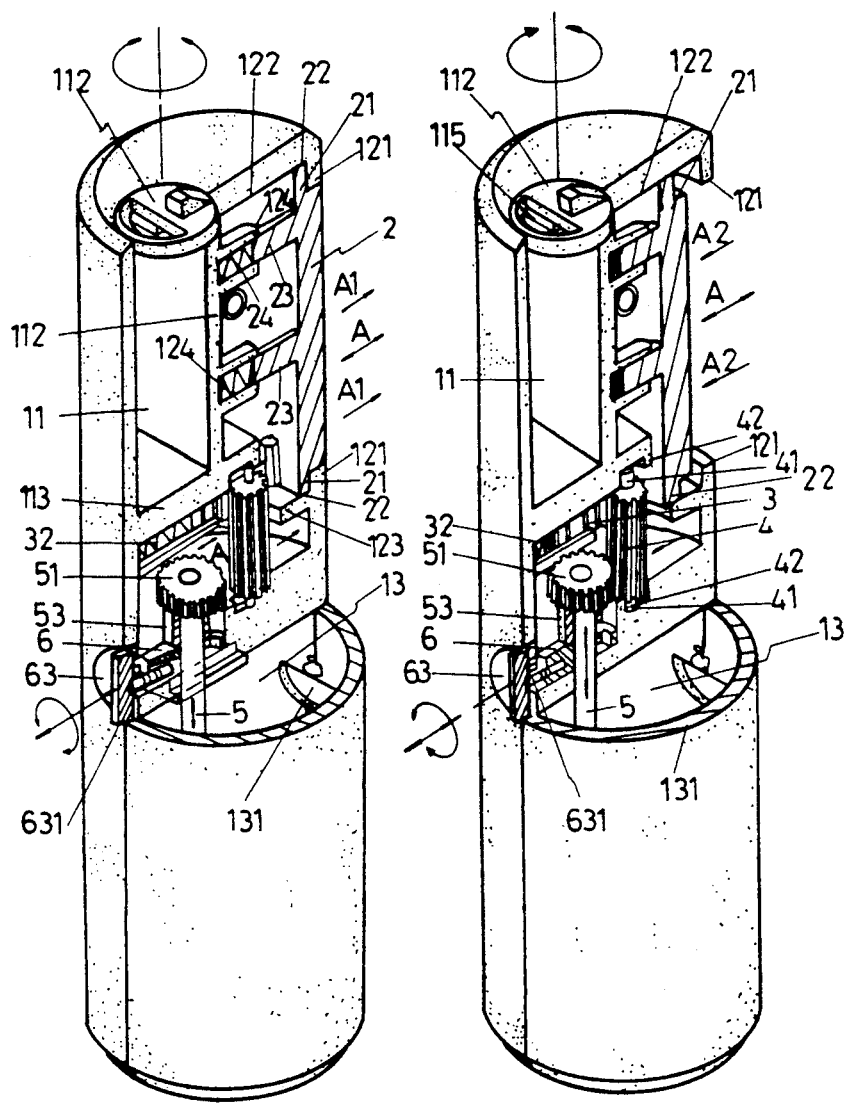
FIG. 7 is a cross-sectional view of the second embodiment of the pepper grinder in the present invention.
FIG. 8 is a cross-section view of the second embodiment of the pepper grinder with the manipulating plate pressed-in in the present invention.
Figure 9:
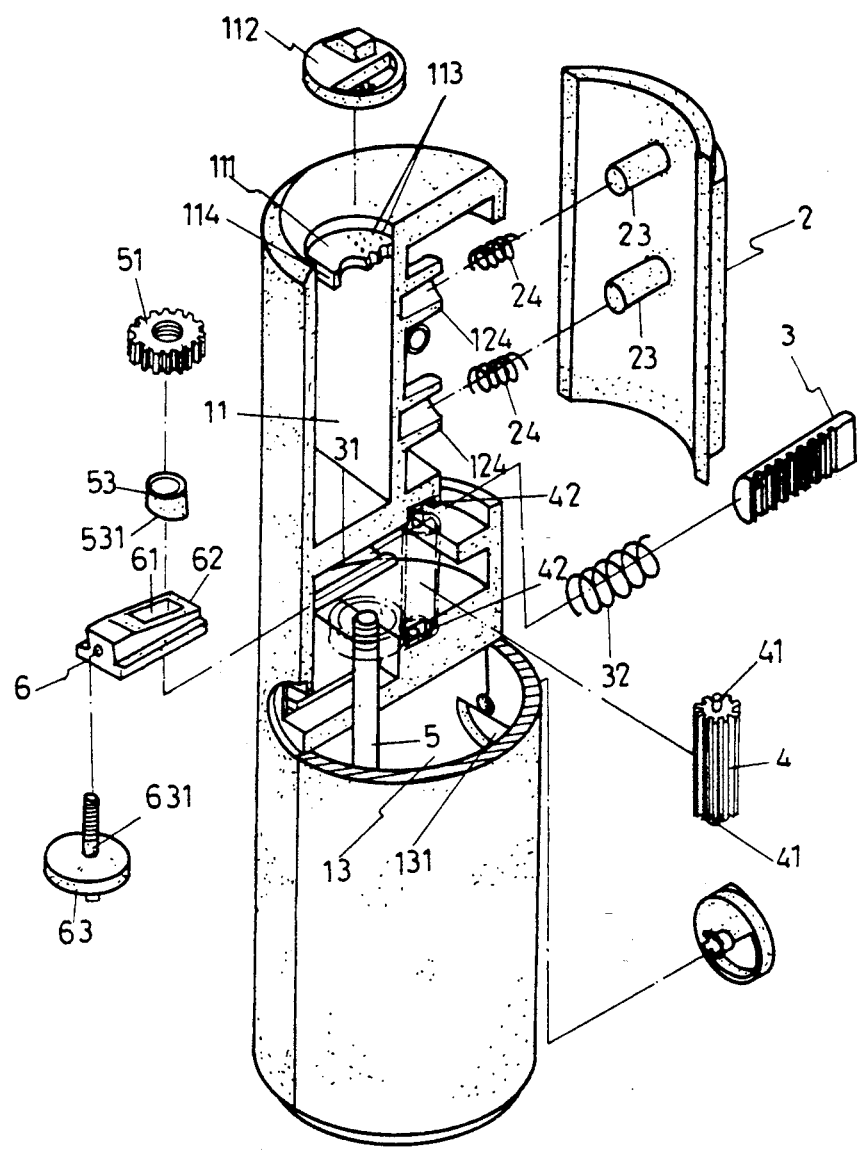
FIG. 9 is an exploded perspective view of the second embodiment of the pepper grinder in the present invention.

A rack 3 is provided in a rack recess 31 under the bottom wall 113 of the salt chamber 11, resiliently pushed by a spring 32 also placed in the rack recess 31, having its front end kept in touch with the inner surface of the manipulating plate 2 so that when the manipulating plate 2 is pressed to move inward, the rack 3 can also be pressed by the plate 2 to move inward compressing the spring 32, and when the plate 2 is released, the rack 3 can be pressed to move outward and accordingly push the plate 2 to move outward to its original position—closing the opening 12, as shown in the arrow mark A2 in FIG. 8 or A1 in FIG. 7.

Figure 10:
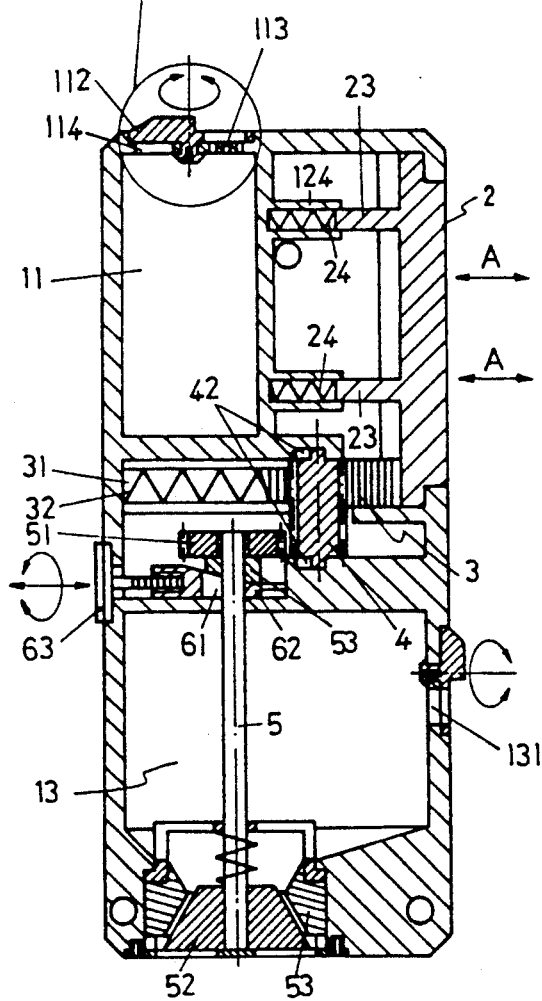
FIG. 10 is a cross-sectional view of the second embodiment of the pepper grinder in the present invention.
Figure 11:
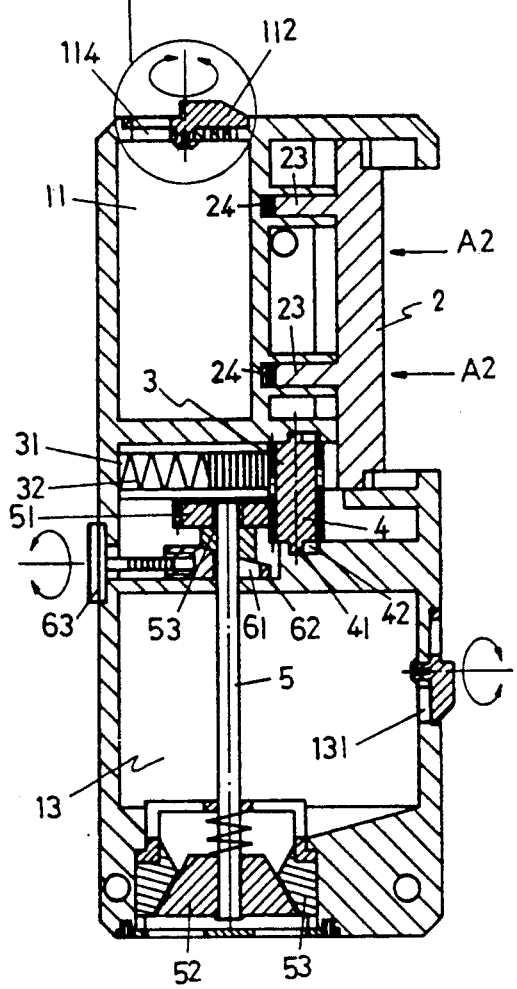
FIG. 11 is a cross-sectional view of the second embodiment of the pepper grinder with the manipulating plate pressed-in in the present invention.

A moving gear 4 is provided to engage with the rack 3, positioned by its top end and bottom end of its shaft fitted in two shaft holes 42 respectively in the bottom surface of the bottom wall of the salt chamber 11 and the upper surface of the upper wall of the pepper chamber 13. Thus, when the plate 2 is pressed to move from the original position to the left (inward), the gear 4 is also rotated and moved to the left by the rack 3 pushed by the plate 2, and the gear 4 can finally engage with and rotate a gear 51 fixed at the top end of a long shaft 5 as shown in FIGS. 8, 11. As the shaft 5 passing through the pepper chamber 13 downward is combined firmly with a grinding wheel 52 at this lower end so that the grinding wheel 52 can be rotated when the shaft 5 is rotated by the gear 51 rotated by the gear 4. On the contrary, if the plate 2 is released to move back to its original position of closing the opening 12 as shown in FIGS. 7, 10, the rack 3 is also moved back, rotating and moving the gear 4 to the right end of the shaft holes 42 so that the gear 4 disengages with the gear 51, and the grinding wheel 52 ceases rotation, too. Therefore, repeated pressing and releasing action of the plate 2 can cause the grinding wheel 52 to rotate to grind the pepper grains falling into the gap between the grinding wheel 52 and a grinding cylinder.

For adjusting the degree of minuteness of the pepper ground, a tube 53 is provided just under and in touch with the gear 51, fixed around the shaft 5, having an inclined bottom end 531. Under the tube 53 is provided a height adjuster 6 of a horizontal rectangular shape, having a rectangular hole 61 for the shaft 5 to pass through as shown in FIGS. 10, 11, an upper inclined surface 62 to touch with the bottom inclined surface 531 of the tube 53, and a threaded sidewise hole to be screwed by a threaded bar 631 of an adjusting button 63 to be located on the vertical outer surface of the body 1. Thus, rotation of the adjusting buttom 63 can pull or push the adjuster 6 such that the tube 53 can be lowered or raised, and accordingly the shaft 5 can also be lowered or raised by the tube 53. In the result, the grinding wheel 52 can be lowered or raised as shown in FIGS. 10, 11 to change the gap distance between the grinding wheel 52 and the grinding cylinder 53 and consequently to change the degree of minuteness of the pepper ground.

Figure 12:
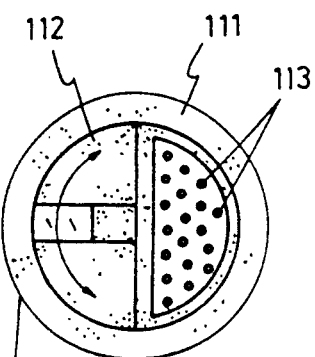
FIG. 12 is an upside view of the lid for filling salt in the second embodiment of the pepper grinder in the present invention.
Figure 13:
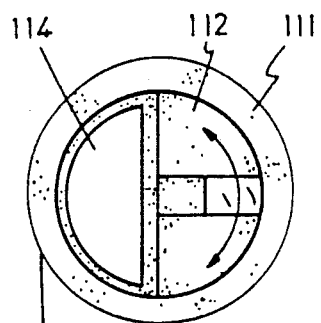
FIG. 13 is an upside view of the lid for filling salt in the second embodiment of the pepper grinder in the present invention.

FIGS. 12, 13 shown a salt filling opening 114 and pouring-out holes 113, which are used to store and pour out salt from the salt chamber 11. And a rotatable lid 112 is provided to cover the salt filling opening 114 or the pouring-out holes 113, having a half-circular opening 115 to face the salt filling opening 114 or the salt pouring-out holes 113.

Figure 14:
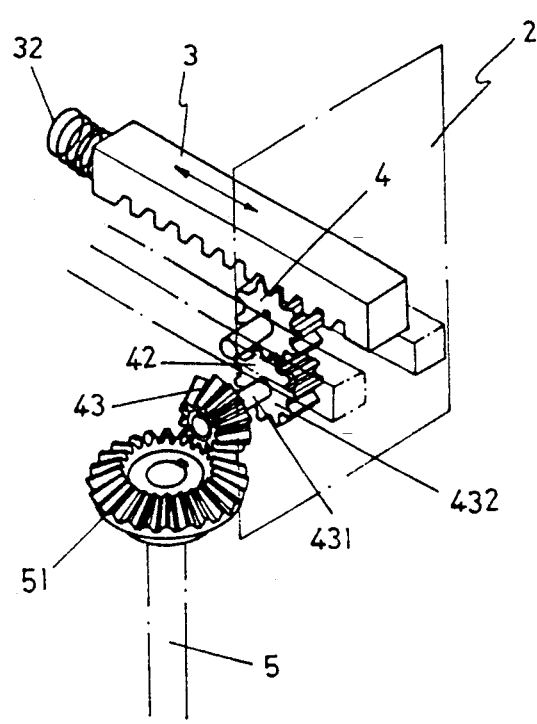
FIG. 14 is a perspective view of another gear unit structure in the second embodiment of the pepper grinder in the present invention.

FIG. 14 shows another kind of gear combination for rotating the shaft 5, wherein a rack 3 is provided with its teeth surface facing downward, engaging with a moving gear 4 having its shaft fitted in two side shaft holes 42. Then under the moving gear 4 is provided a gear 432 mounted on a shaft 431, on which is also mounted a bevel gear 43 meshing with another bevel gear 51 fixed on the top end of the shaft 5. The transmitting theory and effect of the movement of the manipulating plate 2 to the grinding wheel 52 is quite the same as those structure in the first and the second embodiment.

What is claimed is:

1. A pepper grinder comprising:
   a cylindrical body having a salt chamber at an upper section provided with a filling opening covered with a rotatable lid at its top surface and a pepper grain chamber at its lower section provided with a filling opening covered with a rotatable lid in a vertical wall of the body;
   a manipulating plate of a rectangular curved shape to close an rectangular opening in the vertical wall of the upper section of the body, having its upper edge stopped by a projecting-down edge of the body from falling out of the body, and having two tennons at the bottom of its two vertical sides to fit in two mortises set in side walls defining the rectangular opening and a triangular arm projecting radially inward from its inner surface, said two tennons fitting in said two mortises being able to function as pivots to make the manipulating plate incline only inward by manual operation, said triangular arm having a horizontal bottom side to touch with the top face of a vertical rack;
   a rack fitting in a rack recess in the body wall opposite to the rectangular opening and resiliently pushed by a spring at its lower end, having a teeth surface to mesh with a movable gear;
   a movable gear meshing with the rack and having both ends of its shaft fitting and able to move up and down in two shaft recesses;
   a worm mounted on a worm shaft supported in two opposite walls of the body to mesh with a worm wheel mounted on the top end of a long shaft and a gear mounted on the same worm shaft and able to mesh with the movable gear;
   a long shaft vertically passing through the pepper chamber and having its top end mounted with the worm wheel and its bottom end mounted with a grinding wheel;
   two round height adjusters, upper and lower, being located just under the worm wheel and having a central hole for the shaft to pass through, said upper height adjuster having an inclined bottom surface and an adjusting bar projecting out sidewise through the body wall, said lower height adjuster having an inclined upper surface to touch with the inclined bottom surface of the upper one and being immovably fixed with the shaft; and
   said manipulating plate being able to be manually pressed to incline only inward said triangular arm of said plate being able to press down the rack when said plate is pressed inward, said rack being able to rotate and move the movable gear toward the gear mounted on the worm shaft, said movable gear being able to mesh with and rotate said gear, said worm being able to be simultaneously rotated by the rotation of the said gear, said worm wheel being able to be rotated by the worm, said shaft being able to be rotated by the worm wheel, said grinding wheel being able to be rotated by the shaft by pressing inward of the manipulating plate and to be stopped by the shaft by releasing the manipulating plate to its original position of closing the opening, said upper height adjuster being able to be rotated by the adjusting bar to change the mutual touching points of its bottom surface with an upper surface of the lower height adjuster so as to push up the worm wheel, the shaft and finally the grinder wheel so that the gap between the grinding wheel and the grinding cylinder can be altered to change the degree of minuteness of the pepper ground.

2. The pepper grinder as claimed in claim 1, wherein the shaft combined with the worm wheel extends upward to pass through a top wall of the body and a screw-threaded button is provided to screw with the top end of the shaft, said button being able to screw downward or upward to raise or lower the shaft and accordingly to raise or lower the grinding wheel fixed at the bottom end of the shaft to adjust the degree of minuteness of the pepper ground.

3. A pepper grinder comprising;
   a cylindrical body having a salt chamber at an upper section of the body, a pepper chamber at a lower section of the body, the salt chamber having a filling opening and pouring-out holes selectably covered by a rotatable lid, the pepper chamber having a filling opening covered by a rotatable lid, the body also having a vertical rectangular opening in the body wall opposite to the salt chamber and being closed by a movable manipulating plate;
   a manipulating plate being shaped as the rectangular opening in the body to close it and on the circumferential edge defining the opening, and having two horizontal posts projecting from its inner surface to movably fit in two tubal projections on a vertical wall of the salt chamber and to be resiliently pushed by a spring placed in a central cavity of the tubal projections;
   a rack horizontally placed in a rack recess in the bottom wall of the salt chamber and having its rear end resiliently pushed by a spring in the rack recess and its front end in touch with the inner surface of the manipulating plate;
   a movable gear having both the ends of its shaft movably fitting in two shaft holes, one upper in a bottom wall of the salt chamber and one lower in an upper wall of the pepper chamber, engaging with the rack to be rotated right or left, and able to engage with a gear mounted on the top end of a shaft connected with a grinding wheel when it moves to the leftmost;
   a shaft extending vertically through the pepper chamber and having its top end mounted with a gear able to engage with the movable gear and its bottom end mounted with a grinding wheel;
   a gear being mounted with the top end of the shaft;
   a tube being mounted under the gear mounted with the shaft and having an inclined bottom surface to touch with an inclined upper surface of a height adjuster;

a height adjuster being placed under the tube, being shaped rectangular, having a rectangular vertical through hole for the shaft to pass through, an upper inclined surface to touch with the inclined bottom surface of the tube and a sidewise screw-threaded hole for a threaded bar of an adjusting button to screw with;

an adjusting buttom having a threaded bar to adjustably screw with the screw-threaded hole in the height adjuster so as to pull or push the height adjuster and thus to push up or lower down the tube and the gear on it together so that the shaft connected with the grinding wheel can be raised or lowered to change the gap distance between a grinding wheel and a grinding cylinder and accordingly the degree of minuteness of the pepper ground; and said manipulating plate being able to manually press to move only inward from the original position of closing the opening, said rack being possible to rotate the movable gear, said movable gear being able to engage with and rotate the gear on the top end of the shaft, the shaft being possible to rotate the grinding wheel, repeated manual pressing and releasing action of the manipulating plate being able to rotate or stop the grinding wheel so that the pepper grains falling into the gap between the grinding wheel and a grinding cylinder can be ground into powder, and the minuteness of the pepper powder can be adjusted by handling the adjusting button combined with the height adjuster.

4. The pepper grinder as claimed in claim 1, wherein the shaft holes for the shaft ends of the movable gear are shaped rectangular or curved as long as they have the necessary function.

5. The pepper grinder as claimed in claim 3, wherein the rack is arranged horizontal with its teeth facing downward to engage with the movable gear, a gear mounted on a same shaft that a bevel gear is also mounted being provided under the movable gear, the bevel gear engaging with another bevel gear fixed on the top end of a shaft mounted with a grinding wheel, said movable gear being able to engage with and rotate the gear, the bevel gears and finally the shaft and the grinding wheel.

* * * * *